United States Patent
Swahn et al.

(10) Patent No.: US 7,498,775 B2
(45) Date of Patent: Mar. 3, 2009

(54) ELECTRIC MACHINE

(75) Inventors: Håkan Swahn, Oskarshamn (SE); Bertil Svensson, Västervik (SE)

(73) Assignee: E.On Sverige AB, Malmo (SE)

( * ) Notice: Subject to any disclaimer, the term of this patent is extended or adjusted under 35 U.S.C. 154(b) by 0 days.

(21) Appl. No.: 11/803,285

(22) Filed: May 7, 2007

(65) Prior Publication Data

US 2008/0010036 A1    Jan. 10, 2008

Related U.S. Application Data

(62) Division of application No. 10/522,606, filed as application No. PCT/SE03/01229 on Jul. 21, 2003, now Pat. No. 7,242,166.

(60) Provisional application No. 60/426,410, filed on Nov. 15, 2002.

(30) Foreign Application Priority Data

Jul. 31, 2002    (SE) .................................. 0202343

(51) Int. Cl.
*H02P 9/00*    (2006.01)

(52) U.S. Cl. .............................. 322/24; 322/22; 322/28; 322/25; 322/34

(58) Field of Classification Search ................. 322/24, 322/22, 28, 25, 34
See application file for complete search history.

(56) References Cited

U.S. PATENT DOCUMENTS

| | | | |
|---|---|---|---|
| 4,547,826 A | 10/1985 | Premerlani | |
| 4,573,132 A | 2/1986 | Boothman et al. | |
| 4,743,818 A | 5/1988 | Quayle et al. | |
| 5,057,962 A | 10/1991 | Alley et al. | |
| 5,321,308 A | 6/1994 | Johncock | |
| 5,436,784 A | 7/1995 | Schweitzer, III et al. | |
| 5,539,601 A | 7/1996 | Farag | |
| 6,112,554 A | 9/2000 | Terneu et al. | |
| 6,275,012 B1 | 8/2001 | Jabaji | |

(Continued)

FOREIGN PATENT DOCUMENTS

JP    11150993    6/1999

(Continued)

OTHER PUBLICATIONS

J. T. Boys et al., "Empirical thermal model for inverter-driven case induction machines," IEE Proc.-Electr. Power Appl., vol. 141, No. 6, p. 360-372, Nov. 1994.

(Continued)

*Primary Examiner*—Nicholas Ponomarenko
*Assistant Examiner*—Iraj A Mohandesi
(74) *Attorney, Agent, or Firm*—Finnegan, Henderson, Farabow, Garrett & Dunner L.L.P.

(57) ABSTRACT

A method and an apparatus are described for monitoring a rotating synchronous electric machine (9), which comprises a rotor having a rotor winding and a stator having a stator winding. The method comprises the steps of determining the stator winding current, determining the stator winding voltage, determining the rotor winding current, and estimating the temperature in at least two positions in the electric machine (9) using a model of the electric machine and the determined current and voltage values. An apparatus according to the invention is provided for carrying out the method.

6 Claims, 8 Drawing Sheets

U.S. PATENT DOCUMENTS

| | | | |
|---|---|---|---|
| 6,373,230 | B2 | 4/2002 | Jabaji |
| 6,486,638 | B1 | 11/2002 | Sumimoto et al. |
| 6,603,289 | B2 | 8/2003 | Taniguchi et al. |
| 6,700,214 | B2 | 3/2004 | Ulinski et al. |
| 6,700,355 | B2 | 3/2004 | Aoyama et al. |
| 6,750,634 | B2 | 6/2004 | Taniguchi et al. |
| 6,936,996 | B2 | 8/2005 | Uematsu et al. |
| 7,285,937 | B2 * | 10/2007 | Asada ........................ 322/24 |
| 7,292,008 | B2 * | 11/2007 | Asada ........................ 322/24 |
| 7,309,974 | B2 * | 12/2007 | Sarlioglu et al. ............. 322/47 |

FOREIGN PATENT DOCUMENTS

| | | |
|---|---|---|
| JP | 2000274962 | 10/2000 |
| WO | WO 00/67358 | 11/2000 |
| WO | WO 01/17085 A1 | 3/2001 |
| WO | WO 01/17092 A1 | 3/2001 |

OTHER PUBLICATIONS

A. Murdoch et al., "Excitation System Protective Limiters and Their Effect on Volt/Var Control-Design, Computer Modeling, and Field Testing," IEEE Transactions on Energy Conversion, vol. 15, No. 4, p. 440-450, Dec. 2000.

P. Milanfar et al., "Monitoring the Thermal Condition of Permanent-Magnet Synchronous Motors", IEEE Transactions on Aerospace and Electronic Systems, vol. 32, No. 4, pp. 1421-1429, Oct. 1996.

P.L. Stephenson, "Calculation of Temperature Rises Due to Conductor Losses in a Radially-Cooled Turbogenerator Rotor", Central Electricity Generating Board, UK, pp. 150-153, Sep. 1989.

D. Douglas et al., "Dynamic Thermal Ratings Realize Circuit Load Limits," IEEE Computer Applications in Power, pp. 38-45, Jan. 2000.

International Search Report dated Oct. 30, 2003, for International Application No. PCT/SE 03/01229.

* cited by examiner

ELECTRIC MACHINE

This is a divisional application of application Ser. No. 10/522,606, filed Jan. 28, 2005, now U.S. Pat. No. 7,242,166 which is the national stage application of PCT International Application No. PCT/SE2003/001229, filed on Jul. 21, 2003, which claims benefit of priority to Swedish Patent Application No. 0202343-0, filed on Jul. 31, 2002, and U.S. Provisional Application No. 60/426,410, filed on Nov. 15, 2002, all of which are incorporated herein by reference.

FIELD OF THE INVENTION

The present invention relates to a rotating synchronous electric machine and a method for such a machine. More specifically, the present invention relates to an apparatus for monitoring and/or controlling and a method of controlling an electric machine of said type and to a plant or an installation comprising such a machine and such an apparatus.

BACKGROUND ART

Rotating synchronous electric machines are used in various areas of society. For example, power production generators and motors intended for certain applications are usually of this type.

Electric power intended for distribution is generated by means of generators and transformed with the aid of transformers before being transferred and distributed via power grids at different voltage levels. Transformers and power grids are dependent on reactive power to be able to transform and transport the active power from the generators to the users. The reactive power is also used to control the voltage in the power systems. The active power that is generated is consumed in different ways by the users. Many electric appliances used in industry, offices and homes also consume reactive power, for example appliances equipped with a motor. To avoid excessive power loss in the distribution grid, it is necessary to generate reactive power or compensate for the consumption of reactive power. In prior art, this has been achieved, for example, by means of generators and shunt capacitors.

The maximum power produced/consumed in an electric machine is usually based on the machine rating, which is valid for the machine under specific operating conditions. The machine rating defines the maximum current that can flow through the windings of the machine without jeopardizing the service life or functioning of the machine.

Due to dissipation of energy, electric machines heat up during operation. The heat generated must be carried off by means of cooling to avoid overheating of the machine. Different coolants and cooling systems are used depending on the size, application and design of the machine. Cooling by air is predominant in the case of small machines. For enclosed air-cooled machines a heat exchanger is often provided, in which a coolant, such as water, cools the air circulating in and cooling the machine. The cooling systems become more sophisticated and complex with increasing size. Large power production generators are often direct water-cooled and/or indirect water-cooled. Direct water-cooling is used, for example, for rotor and stator alike, but combinations of water/air and water/hydrogen gas are common, the air/hydrogen gas combination being cooled by water before it in turn cools the generator. The coolant or coolants of the machine may in turn be cooled, via heat exchangers, by water from any primary coolant source such as a cooling tower, a river, a lake or the sea. Heat exchangers may, for instance, be of the coolant/water, coolant/air or water/hydrogen gas type. Cooling is achieved by supplying a coolant from the primary coolant source to heat exchangers on the primary side, while the secondary side is connected to a cooling circuit in the electric machine. Alternatively, an intermediate cooling circuit may be used, which may then be used also to cool other systems, such as the excitation system.

Due to disturbances in the normal operation of the power grid, there is sometimes a need for rapidly accessible and controllable reactive power. To meet this need synchronous machines are dimensioned to produce a certain reactive power output. In Sweden, Svenska Kraftnat (the Swedish National Grid) requires generators that are directly or indirectly connected to the national grid to be capable of continuously producing a reactive power output corresponding to a third of the active power output. This means that the generators most of the time will operate below name-plate rating, i.e. the machines are operated using a stator current that is lower than the maximum allowable current and a rotor current that is lower than the maximum allowable current, which results in the temperature of the machines being lower than the rated duty temperature.

Thus, during the greater part of the operating time there is surplus capacity in the generator. It would be desirable to be able to combine the reactive power output capability with normal operation at a more optimal operating point. It would also be desirable to be able to meet acute needs for higher reactive power output without having unexploited capacity in the generator during the greater part of the operating time.

U.S. Pat. No. 5,321,308 discloses a control method and a control apparatus for a generator. The specification describes how to maximize the production of reactive power of a generator. The increase in reactive power necessitates, however, a simultaneous reduction in the production of active power.

In "Dynamic Thermal Ratings Realize Circuit Load Limits", IEEE Computer Applications in Power, pp 38-43, January 2000, a way of temporarily exploiting the power distribution, system better is described. However, the document makes no reference to rotating machines and says nothing about how to compensate for temporary disturbances in the power grid, which require increased production of reactive power.

Thus, it would be desirable to be able to compensate for temporary needs for more reactive power without affecting the available active-power. It is also desirable to be able to use the synchronous electric machine more efficiently without noticeably affecting its service life. It is further desirable to optimize the efficiency of existing and new synchronous electric machines.

SUMMARY OF THE INVENTION

An object of the present invention is to provide an apparatus, a method and a plant or an installation which solve at least one of the problems stated above.

A further object of the present invention is to provide an apparatus or a method which allow greater mean annual power output from a rotating synchronous electric machine which is cooled by different coolants without any modifications to the machine.

Much to their surprise, the inventors have found that it is better to monitor and control a rotating synchronous electric machine and the cooling thereof on the basis of an estimate or the temperature in at least two positions in the machine, said estimate being based on the machine current and voltage as well as on a model of the machine, rather than controlling the machine on the basis of static current and power limit values according to prior art.

An apparatus, a method and a plant according to the invention are defined in the independent claims. Further features of the invention are apparent from the dependent claims.

In the following, different aspects of the invention will be described as well as the advantages obtained.

A method according to the invention for monitoring a rotating synchronous electric machine comprising a rotor having a rotor winding and a stator having a stator winding comprises the steps of determining the stator winding current, determining the stator winding voltage, determining the rotor winding current and estimating the temperature in at least two positions in the electric machine using a theoretical model of the electric machine and the determined current and voltage values.

This method affords improved control of the temperature in the machine. This may be used for improved exploitation of the machine.

Determining here means indirectly or directly measuring or estimating. For instance, it is possible to determine the rotor winding current on the basis of the determined value of the stator winding current and the determined value of the stator winding voltage as well as the determined difference in phase between them. It is also possible to determine the rotor winding current on the basis of the determined value of the active power, the determined reactive power and the determined value of the stator winding voltage.

With theoretical model is meant that the model may be implemented in a computer in contrast to a replica. The theoretical model may be based on empirical tests or may have been derived in some other way.

Due to the geometrics of electric machines and the geometries of the cooling of many electric machines the temperature varies in the axial direction as well as in the radial direction. It is, however, a reasonable assumption that the bars of the stator winding will have the same temperature in the tangential direction but this value varies with the loading of the machine. The same holds true for the rotor winding, the stator teeth and the rotor teeth. To model this situation, the stator winding and the rotor winding may be divided into a number of zones in the axial direction. The stator core and the rotor may be divided into a number of zones. The regions closest to the airgap may also be divided into a set of zones in the axial direction.

By dividing the stator and/or the rotor in a number of zones an improved estimation of the temperature in the machine may be achieved and thus also an improved control of the machine.

The model may utilise different measured variables such as: (1) active power, (2) reactive power, (3) terminal voltage, (4) stator current, (5) rotor current, (6) seawater temperature, (7) temperature of cold stator cooling-water, (8) temperature of cold hydrogen (9) the temperature of the intermediate cooling-water and (10) hydrogen pressure. It is then possible to determine the input variables to the model, namely: (1) stator current, (2) rotor current, (3) terminal voltage, (4) temperature of cold stator cooling-water, and (5) temperature of cold hydrogen.

The model may use any combination of the above mentioned variables.

The model may use any combination of the mass of a zone of the machine, the specific heat capacity of a zone, the heating power of a zone and the cooling power of a zone. The heating power may be modeled using the temperature dependent resistance of the windings and the current through the windings.

An even more accurate estimate of the temperature can be obtained by using also a temperature measured in a point in the machine as a basis for the estimation.

From a practical point of view it is possible to measure temperature at several locations in the machine. It can also be measured indirectly, for example by measuring the temperature of the coolant leaving the machine.

An improved estimate of the temperature of machines with variable speed can also be obtained by measuring the rotor speed and taking the measured rotor speed into account when estimating the temperature.

According to a further aspect of the invention, a method is provided for controlling at least one variable of a rotating synchronous electric machine, which comprises a rotor having a rotor winding and a stator having a stator winding. The method comprises the steps of determining the stator winding current, determining the stator winding voltage, determining the rotor winding current and estimating the temperature in at least two positions in the electric machine using a model of the electric machine and in dependence on the determined current and voltage values, and controlling said at least one variable in dependence on the estimated temperatures.

Where the machine is a generator, one advantage obtained by means of a method according to the invention is that more power can be extracted from the generator than is possible when the generator is controlled on the basis of the machine rating, which defines the maximum active power that can be generated in the generator during specific operating conditions, which implies, inter alia, that the maximum allowable active power and the maximum allowable reactive power are generated in the generator at the same time, and that the temperature of the coolant is the maximum allowable temperature.

Where the machine is a motor, one advantage obtained by means of a method according to the invention is that more power can be extracted from the motor than is possible when the motor is controlled on the basis of the machine rating, which defines the maximum allowable active power load to which the motor can be subjected under specific operating conditions, which implies, inter alia, that the maximum allowable active power is converted at the same time as the maximum allowable reactive power is generated in the motor, and that the temperature of the coolant is the maximum allowable temperature.

Where the machine is a motor with variable-speed control, one advantage obtained by means of a method according to the invention is that more power can be extracted from the motor than is possible when the motor is controlled on the basis of the machine rating, which defines the maximum allowable active power load to which the motor can be subjected under specific operating conditions, one of the conditions being that the maximum active power is converted at the same time as the maximum reactive power is generated in the motor, and that the temperature of the coolant is the maximum allowable temperature. Usually, ratings are given for different speed values.

Where the machine is a synchronous compensator, one advantage obtained by means of a method according to the invention is that more reactive power can be extracted from the synchronous compensator than is possible when the synchronous compensator is controlled on the basis of the machine rating, which defines the maximum reactive power that can be generated under specific operating conditions, which implies, inter alia, that the maximum allowable reactive power is generated/consumed in the synchronous compensator, and that the temperature of the coolant is the maximum allowable temperature.

Where the machine is a frequency converter, one advantage obtained by means of a method according to the invention is that more power can be transmitted in the frequency converter than is possible when the frequency converter is controlled on the basis of the machine rating, which defines the maximum active power that can be transmitted in the frequency converter under specific operating conditions, which means, inter alia, that the maximum allowable active power and reactive power are transmitted in the frequency converter at the same time, and that the temperature of the coolant is the maximum allowable temperature.

More power can be generated in and supplied to an electric machine according to the invention than in a machine which, according to prior art, is controlled on the basis of the machine rating, since the invention allows control based on the actual conditions, i.e. the electric machine can be controlled on the basis of the actual cooling capacity, for example depending on the coolant temperature, the coolant flow or the coolant pressure.

By using a model of the machine for the control thereof, it is possible to arrive at an estimate of temperatures in one or more points in the electric machine on the basis of measurements and/or calculations of the machine current and voltage as well as the available cooling capacity. According to one embodiment, the temperatures in said one or more points are estimated. The estimated temperatures may be compared with the maximum allowable temperatures and one or several input variables may be controlled to avoid that the temperature in any point in the electric machine exceeds the maximum allowable temperature.

When the temperature in an electric machine varies, different parts of the machine will expand to different degrees. This results in mechanical wear, which accelerates the ageing of the machine. According to one embodiment, the electric machine is controlled in such manner that at least one estimated temperature is kept essentially constant. One advantage thus obtained is that the machine will have a longer service life due to reduced mechanical wear.

According to one embodiment, the electric machine and the cooling capacity are controlled in such manner that, in normal operation, the estimated at least one temperature in the machine is kept essentially constant.

According to one embodiment, at least one estimated temperature is kept essentially constant, although an increase in said temperature to a default value is allowed for a certain limited period of time to ensure maximum exploitation of the machine, the machine and cooling capacity control being adapted to this operation mode.

Usually, the electric machine is cooled by at least one coolant. This coolant may be air, but is often a liquid or a gas, such as hydrogen gas, which in turn, usually via a heat exchanger, is cooled by water from a primary coolant source. According to one embodiment, the temperature of the coolant from the primary coolant source is measured and the control of the electric machine is effected also in dependence on the available cooling capacity of the coolant. This measurement allows maximizing of the power output from the machine by using the variations in temperature of the primary coolant. It is thus possible to use, for example, cold seawater in E winter for the purpose of increasing the power output. In prior art, the power output from a machine is controlled on the basis of the machine rating, which presupposes a constant maximum temperature of the coolant.

According to one embodiment, the temperature of the coolant from the primary coolant source is measured and the information about the temperature variations of the coolant from the primary coolant source, in combination with the control range available in the cooling system of the machine, is used to control the electric machine. Using this type of control allows a lower temperature to be obtained in the machine. A lower temperature in the machine means lower winding resistance, which reduces losses.

According to a further embodiment, the temperature of the coolant is measured and the control of the active power and the reactive power in the electric machine is effected in dependence on the temperature of the coolant.

The cooling capacity may be controlled, for example by controlling the rotational speed of coolant pumps, by controlling a valve which regulates the amount of outgoing cooling water that is to be input as incoming cooling water and/or by controlling the gas pressure of a machine, which at least partly is cooled by gas.

For certain types of operation, the accuracy of the model may be improved by calibrating the model against a temperature measured in the machine.

Where the electric machine is a generator, the generator is controlled, according to one embodiment of the invention, by controlling at least one of the active power and the reactive power of the generator.

According to one embodiment of the invention, the reactive power of the generator is controlled by controlling the current supplied to the rotor.

Usually, the generator is directly or indirectly connected to one or more turbines.

According to one embodiment of the invention, control is effected by means of a first allowable temperature and a second allowable temperature, control being effected in such manner that said estimated temperature is allowed to reach the first allowable temperature as a steady value and that said estimated temperature is allowed to reach the second allowable temperature only for a predetermined period of time.

According to one embodiment of the invention, a floating capability chart is used to define the boundaries of the allowable electric power of the machine, depending on such variables as the available cooling capacity. In this case, the electric machine is controlled so that the combination of reactive and active power does not exceed the boundaries of the capability chart. It should be understood that other definitions of the permissible power combinations are possible, but the above definition is a practical way of defining permissible power. This is equivalent to controlling by means of a first allowable temperature.

According to one embodiment of the invention, a floating dynamic capability chart is used for the purpose of controlling the electric machine and the cooling thereof. The dynamic capability chart defines the boundaries of the allowable electric power of the machine when the temperature in the machine is allowed to exceed allowable temperature at continuous operation. The electric machine and the cooling thereof are controlled so that the combination of reactive and active power does not exceed the dynamic capability characteristic. The dynamic capability chart defines allowable combinations of active and reactive power during a short time interval. As long as the dynamic capability chart is not exceeded, the temperature in the electric machine will not exceed a specified maximum allowable temperature. This is equivalent to controlling as described above using a second allowable temperature.

According to one embodiment, a generator is controlled with a floating capability chart in dependence on the available cooling capacity. Since a disturbance necessitates increased power output for a short period of time, a dynamic capability chart may be used to control the generator for a short period of time, the dynamic capability chart being dependent on the temperature that the machine is allowed to reach. The allowable temperature may be adjusted, for example, to the actual temperature resistance of the insulation or may be set by the machine operator.

It goes without saying that it is possible to operate the machine using only one dynamic capability chart and thus exploiting the temperature resistance of the insulation only temporarily, without making use of the additional margin available due to the cooling water temperature.

According to a second aspect of the invention, a control apparatus is provided for controlling a rotating synchronous electric machine. The control apparatus is characterized in that it comprises stator current and stator voltage signal inputs, and that the control apparatus is adapted to transmit control signals for controlling at least one variable in the electric machine depending on the signals of the signal inputs and using a model of the electric machine, which model is used to estimate the temperature in at least two positions in the electric machine.

Suitably, a control apparatus of this kind is implemented by means of one or more computers which are programmed accordingly, but evidently it may also be implemented by means of dedicated electronic equipment, such as one or more ASICs (Application-Specific Integrated Circuits). Naturally a control apparatus according to the invention may be adapted to implement one of the features described above, advantages equivalent to the ones described in connection with each of the features being obtained.

An apparatus according to the invention for monitoring or controlling a rotating synchronous machine may of course also comprise a storage means and/or a display means.

According to a further aspect of the invention, a memory medium is provided on which a computer program is stored for controlling a rotating synchronous electric machine, which comprises a rotor having a rotor winding and a stator having a stator winding. When the computer program is executed on a computer, it causes the computer to receive an input signal containing stator winding current data and to receive an input signal containing stator winding voltage data. The program further causes the computer to estimate the temperature in at least two positions in the electric machine using a model of the electric machine.

According to yet another aspect of the invention, a power-generating plant is provided, which comprises one or more turbines and one or more generators connected thereto and which is controlled by means of a control apparatus as described above.

A method according to the invention may be used in an installation for generating electric power, which comprises one turbine and one generator.

The power-generating installation may be used in power plants of many different types, for example gas turbine power plants, nuclear power plants, oil-fired power plants and hydroelectric power plants.

For power stations the bus-duct (IPB), the generator circuit breaker (GCB) or the generator step-up transformer (GSU) may be a limiting factor for the output power from the generator. In such cases the temperature of these devices can control the generator output and/or the control apparatus for the generator can control the cooling power for these systems.

Whenever measurement is mentioned in this specification, the measuring signal may be generated by any type of sensor, for example temperature sensors, such as thermocouples, Pt 100 sensors etc; current sensors, such as magnetic current transformers, optical current transformers, current shunt, Rogowski coils etc; or voltage sensors, such as magnetic voltage transformers, optical voltage transformers, capacitive voltage dividers, resistive voltage dividers etc.

It goes without saying that the above features can be combined in one embodiment.

In the following, preferred embodiments of the invention will be described with reference to the appended drawings.

DESCRIPTION OF PREFERRED EMBODIMENTS

Figure 1:
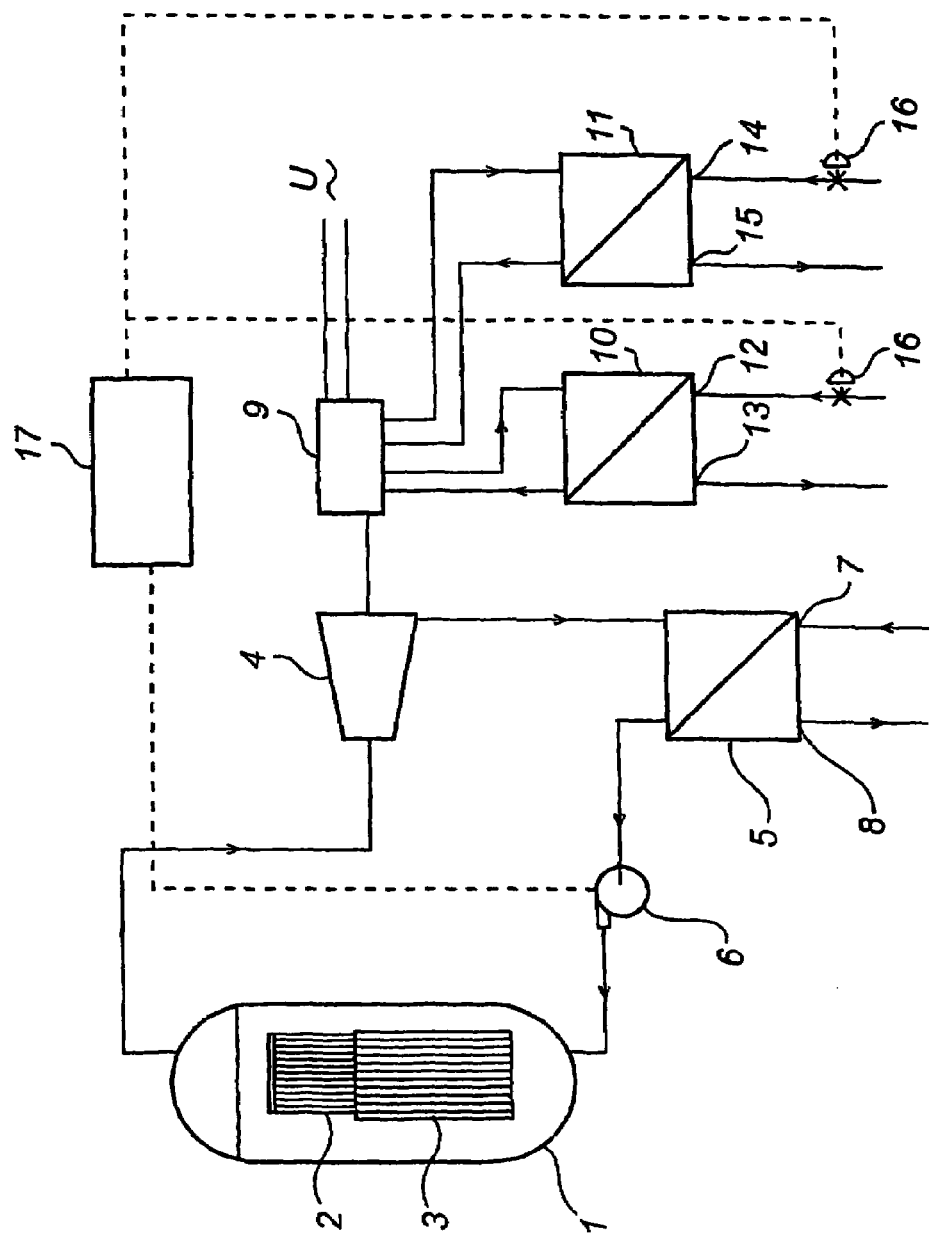
FIG. 1 illustrates a power plant according to one embodiment of the present invention.

FIG. 1 is a schematic illustration of a nuclear power plant in which the present invention can be implemented. It should be understood that the nuclear power plant shown in FIG. 1 is highly simplified to clearly illustrate the invention.

The nuclear power plant comprises a reactor tank 1 with fuel rods 2 and control rods 3. Steam used to operate a turbine 4 is generated in the reactor tank. The steam turbine 4 may contain several turbines, for example one high-pressure turbine and three low-pressure turbines. The turbine 4 in turn operates a generator 9, which produces electric power. The generator is shown in more detail in FIG. 7. After the steam has passed through the turbine 4, it is conveyed to a condenser 5 in which the water vapor is condensed, and then it is recirculated in the form of water to the reactor tank 1 by a pump 6. The condenser 5 is cooled by water from a primary coolant source, the water being supplied to the condenser 5 through a first inlet 7 and discharged through a first outlet 8.

Figure 7:
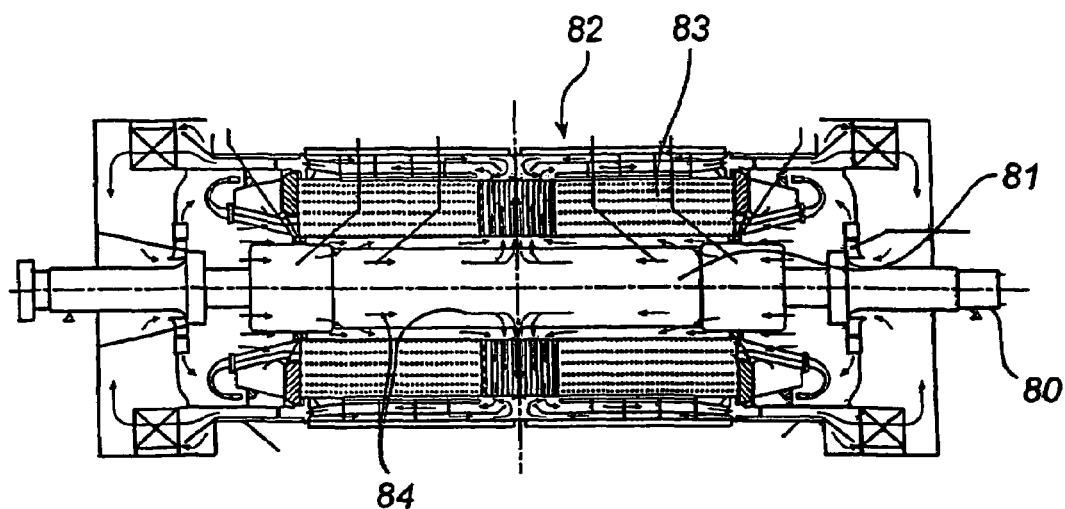
FIG. 7 illustrates a generator that can be controlled by means of a method according to the invention.

FIG. 7 illustrates a generator 9 according to one embodiment of the invention. The generator 9 comprises a rotor 80 having a rotor winding 81 and a stator 82 having a stator winding 83. The arrows 84 in the figure indicate the flow of a coolant through the machine.

Electric power is supplied from the generator at the connection designated U in FIG. 1. It should be understood that the output from the generator does not necessarily have to be single-phase AC voltage, but may just as well be three-phase voltage. The generator 9 is cooled by water and hydrogen gas. In the embodiment shown in FIG. 1, the generator is connected to a first heat exchanger 10 and a second heat exchanger 11, each used in their respective cooling circuit. The first heat exchanger 10 has a second inlet 12 and a second outlet 13 and the second heat exchanger has a third inlet 14 and a third outlet 15. The generator has an enclosure filled with hydrogen gas, which is cooled in the first heat exchanger 10. The hydrogen gas primarily cools the rotor and the stator core. The stator winding is cooled by water. The winding is provided with ducts in which the cooling water flows. The cooling water is cooled in the second heat exchanger 11.

The cooling effect of the incoming cooling water can be controlled by means of controllable valves 16 provided on the inlets of the heat exchangers 10 and 11. The valves 16 are controlled by a computerized control system 17, which also controls the output power of the generator.

According to one embodiment, the control system 17 is a computer provided with software. The control system 17 may consist of several interconnected computers. Of course, a plurality of computers that are not interconnected may also be used to control different parts of the nuclear power plant.

Figure 2:
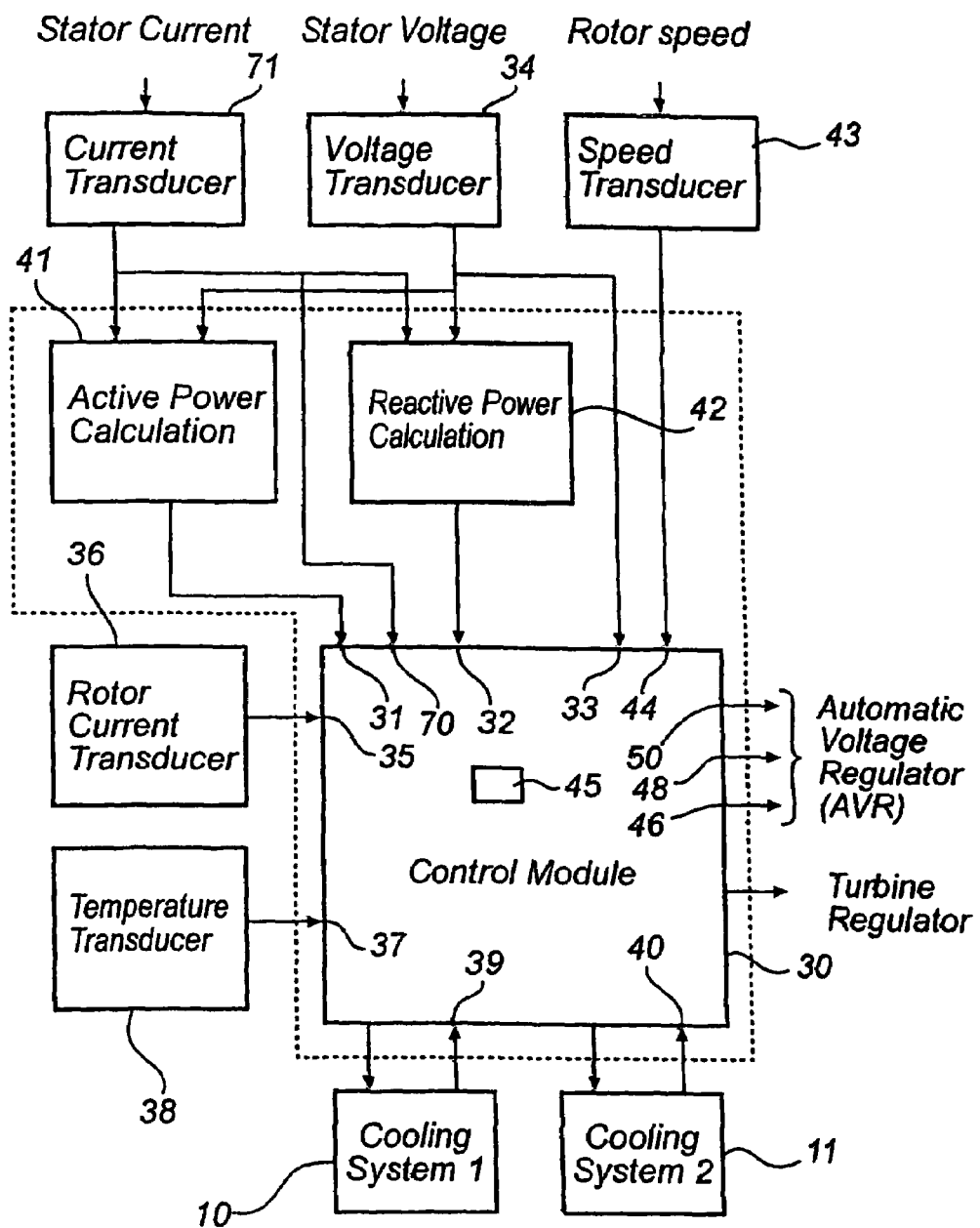
FIG. 2 is a flow chart for a method according to the present invention.

FIG. 2 shows a flow chart illustrating the functioning of a control system for controlling a generator and the cooling system associated therewith according to the invention. The control system has a control module 30, which has a first active power signal input 31, a second reactive power signal input 32, a first voltage signal input 33, which receives a signal from a voltage transducer 34, and a rotor current signal input 35, which is adapted to receive a rotor current signal from a rotor current transducer 36. The control system further has a stator current signal input 70, which is adapted to receive a signal from a stator current transducer 71. Moreover, the control system has a temperature signal input 37, which is adapted to receive a temperature signal from a temperature transducer 38. The control system has a first active power calculation unit 41, which is connected to a stator current transducer 71 and a stator voltage transducer 34, and a second reactive power calculation unit 42, which is connected to the stator current transducer 71 and the stator voltage transducer 34. In addition, the control module 30 has a first cooling signal input 39, which is adapted to receive a signal containing information on the temperature of the cooling water supplied to the first heat exchanger 10 shown in FIG. 1, and a second cooling signal input 40, which is adapted to receive a signal containing information about the temperature of the water supplied to the second heat exchanger 11 shown in FIG. 1.

The active power is calculated in the first calculation unit 41, which is connected to both the stator current and the stator voltage. The reactive power is calculated correspondingly in the second calculation unit 42, which is connected to both the stator voltage and the stator current. The calculation of the active power and the reactive power can be carried out in any one of a number of ways, which will all be obvious to the person skilled in the art and which are not described in more detail here.

With reference to FIG. 2, a speed transducer 43 is provided which measures the rotor speed and feeds a speed signal to a speed signal input 44 of the control module. It should be noted, however, that in applications with little speed variation it is possible to leave out the speed transducer without any major-detrimental effect on the control system function. Moreover, the control module comprises a memory 45 in which a model of the electric machine is stored. In addition, information on allowable temperatures in different parts of the machine is stored in the memory 45.

All the input signals to the computer and the information stored in the memory allow the control module to control the generator and the cooling thereof in such manner that the temperature in the different parts of the generator does not exceed set limits. The set limits of the different parts of the generator are dependent on the material used in the different parts of the generator.

Figure 3:
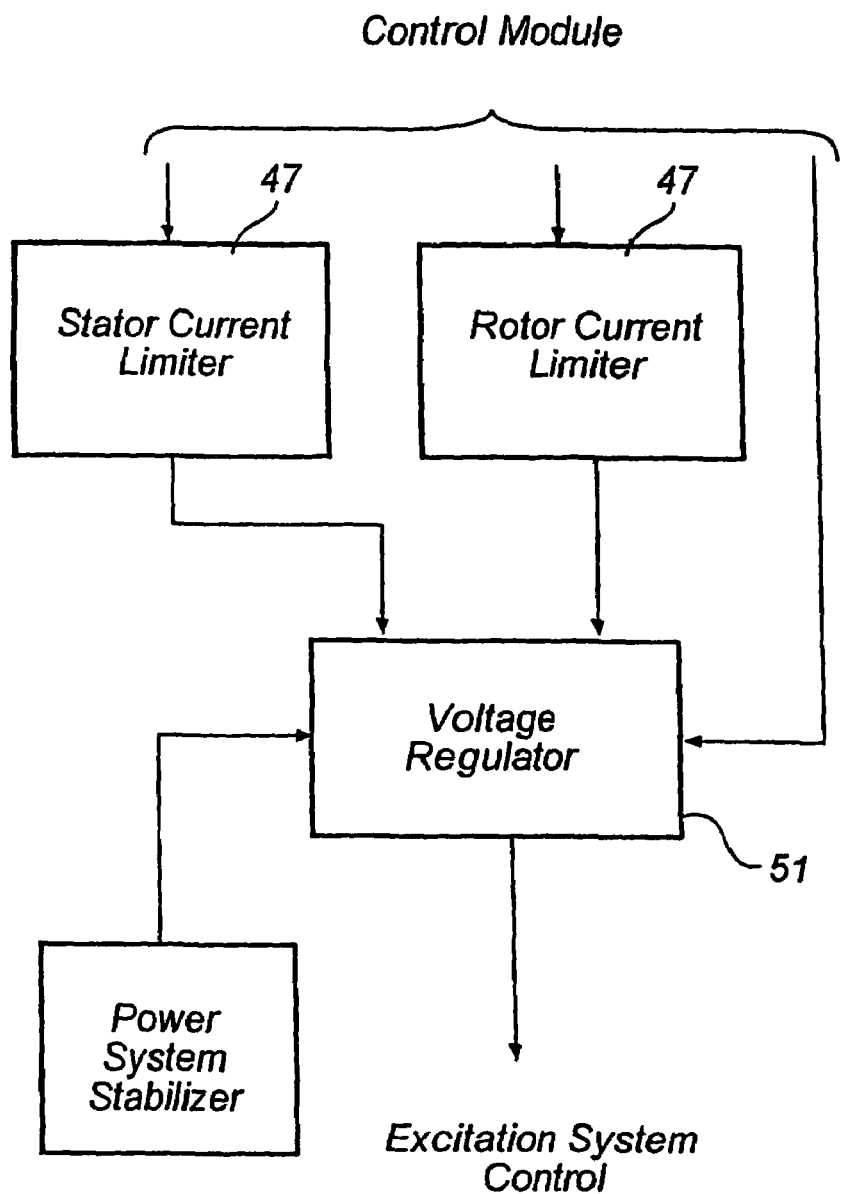
FIG. 3 illustrates the functioning of a voltage regulator according to the present invention.

FIG. 3 illustrates an automatic voltage regulator module according to the invention. The voltage regulator receives input signals from the control module 30 shown in FIG. 2. A first output 46 on the control module 30 is connected to the stator current limiter 47, a second output 48 on the control module 30 is connected to the rotor current limiter 49 and a third output 50 on the control module 30 is connected to the voltage regulator 51. The voltage regulator 51 has an output which is connected to the generator for controlling the excitation thereof.

Figure 4:
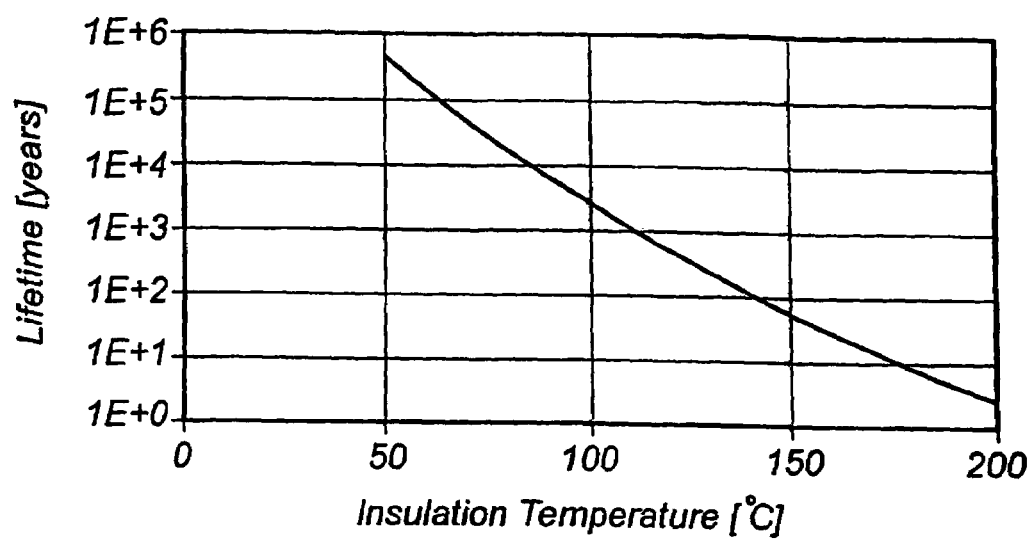
FIG. 4 illustrates how the service life of a generator insulation basically varies as a function of the operating temperature.

FIG. 4 is a graphic representation of the service life of the generator insulation as a function of the insulation temperature. As shown, a mica-based generator insulation has a service life of about $10^5$ years at a temperature of 50° C. An increase in temperature of about 10° C. reduces service life by a factor two. As shown in the figure, the service life of the insulation is about 40 years at a temperature of 155° C. A service life of 40 years is considered to be sufficient for a generator and the temperature of 155° C. is therefore used as the limit value for this kind of insulation. If the limit value is exceeded temporarily, the service life will be reduced in proportion to the period of time that the insulation is kept at this high temperature.

The method for estimation of critical temperatures in a rotating electrical machine is illustrated by considering a big turbo-generator. The stator and rotor of the turbo-generator are illustrated schematically in FIGS. 5 and 6, respectively. The stator winding is cooled by stator cooling-water while the rotor winding and the core is cooled by hydrogen. The stator cooling-water is cooled by intermediate cooling-water, which in turn is cooled by seawater. The stator cooling-water enters the machine at one end of the stator and leaves the machine at the other end of the stator. The hydrogen enters the machine at both ends of the machine and leaves the active parts of the machine at the mid-section of the generator. This means that the temperature in the stator winding and the rotor winding vary in axial direction. It is, however, a reasonable assumption that the temperature in the stator core and the rotor is assumed homogenous in tangential direction. To model this situation, the stator winding and the rotor winding are divided into a number of zones in the axial direction. The stator core and the rotor are divided into a number of cylindrical zones and the zones closest to the airgap are also divided into a set of zones in the axial direction.

Figure 5:
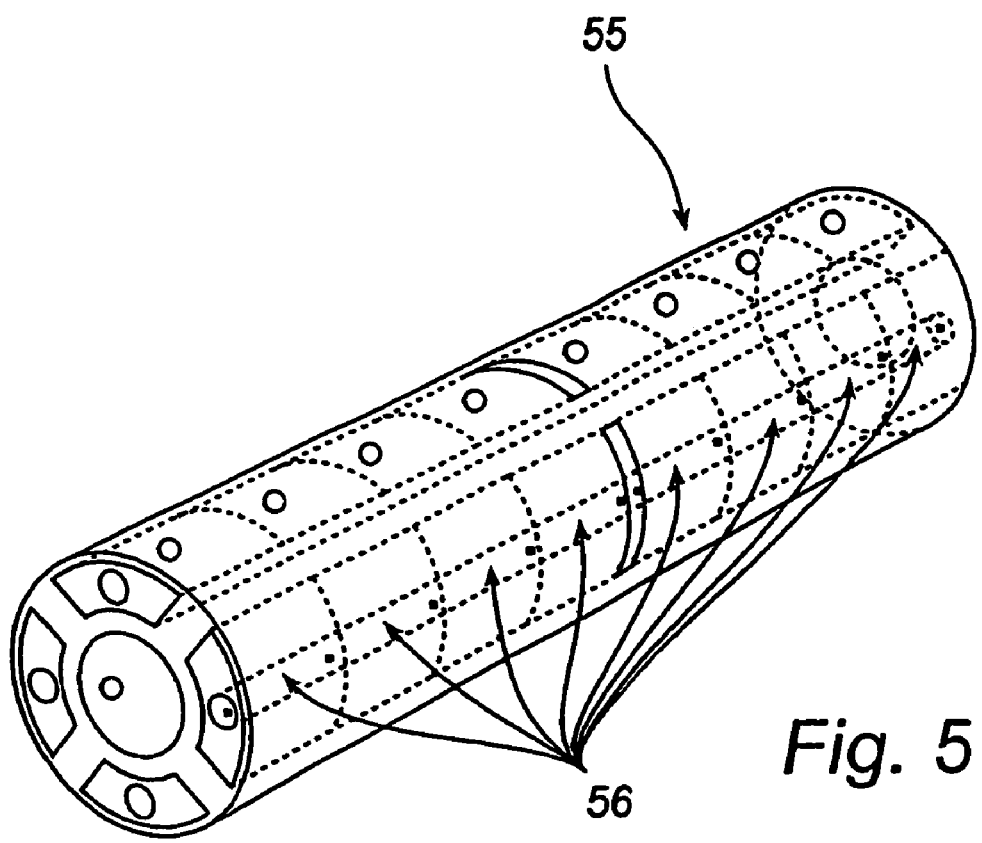
FIG. 5 illustrates how the rotor according to a model according to the present invention is divided into zones.

FIG. 5 shows how the rotor may be divided into zones. The rotor 55 is divided into a number of zones 56 in which the temperature is estimated.

Figure 6:
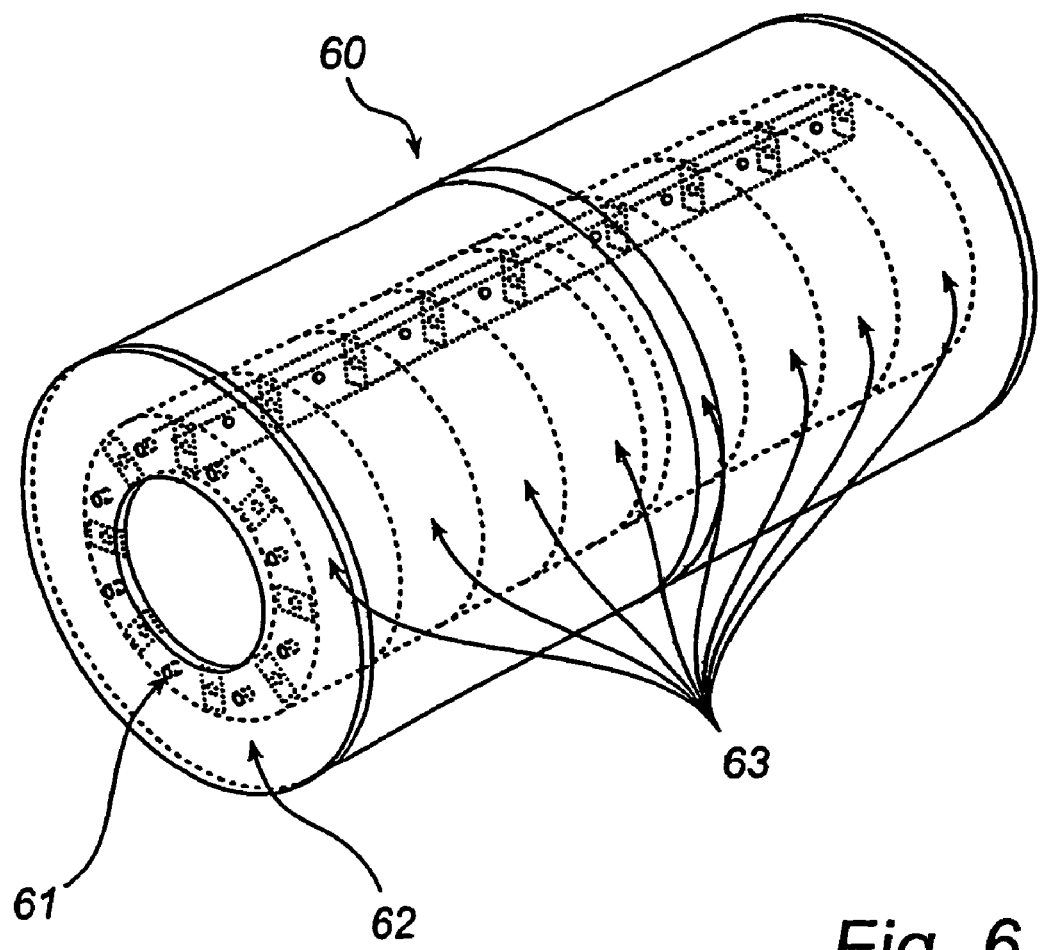
FIG. 6 illustrates how the stator according to a model according to the present invention is divided into zones.

FIG. 6 shows how the stator 60 may be divided into an inner zone 61 and an outer zone 62. The inner zone 61 is divided into a number of subzones 63.

The model may utilise different measured variables such as: (I) active power, (II) reactive power, (III) terminal voltage, (IV) stator current, (V) rotor current, (VI) seawater temperature, (VII) temperature of cold stator cooling-water, (VIII) temperature of cold hydrogen (IX) the temperature of the intermediate cooling-water and (X) hydrogen pressure. It is then possible to determine the input variables to the model, namely: stator current, rotor-current, terminal voltage, temperature of cold stator cooling-water, and temperature of cold hydrogen.

The dynamic model consists of a set of non-linear differential equations to estimate the temperature of each section in the machine from the input variables. The equations are given by fundamental physical laws and data for the physical properties of the materials used in the machine. Some of the temperatures in the model can be measured and it is possible to improve the estimation of the temperatures by comparing the estimated and measured temperatures. The estimated temperatures are corrected by adding a correction term depending on the difference between the measured and estimated temperature. Equation (1) gives the temperature of the i:th zone of the machine. A zone may be: (1) an axial zone of the rotor winding, (2) an axial zone of the stator winding, (3) an axial and/or radial zone of the rotor teeth, (4) an axial and/or radial zone of the stator teeth, (5) an axial and/or radial zone of the rotor body, (6) an axial and/or radial zone of the stator core, and (7) an axial and/or radial zone of the pressplates.

$$m_i \cdot c_{p,i} \cdot \frac{dT_i}{dt} = P_{h,i} - P_{c,i} \qquad (1)$$

Here:
$m_i$ the mass of the i:th zone of the machine [kg],
$c_{p,j}$ the specific heat capacity of the i:th zone [J/(kg·K)],
$P_{h,i}$ the heating power of the i:th zone [W] and
$P_{c,j}$ the cooling power of the i:th zone [W]

Equation (2) gives the heating power $P_{h,j}$ [W] of the i:th zone of a rotor or stator winding:

$$P_{h,i} = (1+k) \cdot R_i(T_i) \cdot I_i^2 \qquad (2)$$

Here:
k a factor that takes into account the stray losses in the stator winding and which can be obtained by a theoretical analysis of the winding or by using the results from a heat run,
$R_i$ the DC resistance of the i:th zone of a winding [ohm] given by equation (5) below, and
$I_i$ the current through the i:th zone of a winding [A]. The current $I_i$ may be equal to the current in the rotor winding (input variable) or equal to the current in the stator winding (input variable).

Equation (3) gives the heating power $P_{h,i}$ [W] of the i:th zone of the stator core:

$$P_{h,i} = f(U) \qquad (3)$$

Here:
f a (non-linear) function, which may be obtained from the magnetising curve of the core laminations or from the no-load tests,
U the terminal voltage [V].

Equation (4) gives the heat $P_p$ [W] developed in a pressplate:

$$P_p = g(I, \phi) \qquad (4)$$

Here:
I the stator current [A], (input variable),
$\phi$ the phase difference between stator current and terminal voltage tan($\phi$)=Q/P. (input variable), The function g(·) may be obtained by using formulas in "New Operating Chart for Large Power Turbogenerators" by Latek, W.; Partyka, W. & Bytnar, A. presented in Report 11-101 at the CIGRE Session in Paris on 26$^{th}$ August to 1$^{st}$ September 1990 or by using measured temperatures of the pressplates during steady state operation of the machine under various operating conditions. The cooling power of the pressplates are given by equation (6) below. The function g(·) above may have different parameters for the driven end and the non-driven end. Equation (5) below gives the resistance $R_i(T_i)$ [ohm] of the i:th zone of a winding when its temperature is equal to $T_i$ [° C.].

$$R_i(T_i) = R_a \frac{T_0 + T_i}{T_0 + T_a} \qquad (5)$$

Here
$R_a$ is the resistance [ohm] of zone at ambient temperature, which can be obtained from a theoretical calculation using the physical dimensions of the winding or from resistance measurements during workshop tests of the machine,
$T_0$ is a temperature [° C.] typical for the winding material depending on the alloy used to manufacture the winding, and
$T_a$ is a temperature [° C.] typical for the winding material depending on the alloy used to manufacture the winding.

Equation (6) gives the cooling power $P_{c,i}$ of the i:th zone:

$$P_{c,i} = h_i(p_c) \cdot (T_i - T_{c,i}) + \sum_{j=1}^{n} \lambda_{i,j} \cdot (T_i - T_{i,j}) \qquad (6)$$

Here:
$h_i(p_c)$ convection heat-transfer coefficient [W/° C.] of the i:th zone when the coolant pressure is equal to $p_c$,
$p_c$ pressure of the coolant [Pa],
$T_i$ the temperature of the i:th zone of the machine [° C.],
$T_{c,i}$ the temperature of the coolant at the i:th zone [° C.].

Equation (7) gives the outlet temperature of the coolant in the zones of a cooling duct:

$$T_{d,1} = T_{cc} + \frac{Q_{d,1}}{\rho_c \cdot c_{p,c} \cdot F_d} \qquad (7)$$

$$T_{d,2} = T_{d,1} + \frac{Q_{d,2}}{\rho_c \cdot c_{p,c} \cdot F_d}$$

$$\vdots$$

$$T_{d,n} = T_{d,n-1} + \frac{Q_{d,n}}{\rho_c \cdot c_{p,c} \cdot F_d}$$

Here:
$T_{cc}$ is the temperature of the cold coolant entering the cooling duct (input variable) [° C.],
$Q_{d,j}$ is the heat flow to the j:th zone of the cooling duct [W]. The heat flow is equal to the cooling power of the i:th zone of the machine defined by equation (6). The relation between j and i depends on the actual subdivision of the machine into zones and the configuration of the cooling ducts.
$\rho_c$ is the density of the coolant in the cooling duct [kg/m³],
$c_{p,c}$ is the specific heat capacity at constant pressure of the coolant in the cooling duct [J/(kg·K)] and
$F_d$ is the mass rate of flow of coolant in the cooling duct (input variable) [kg/s].

Figure 8:
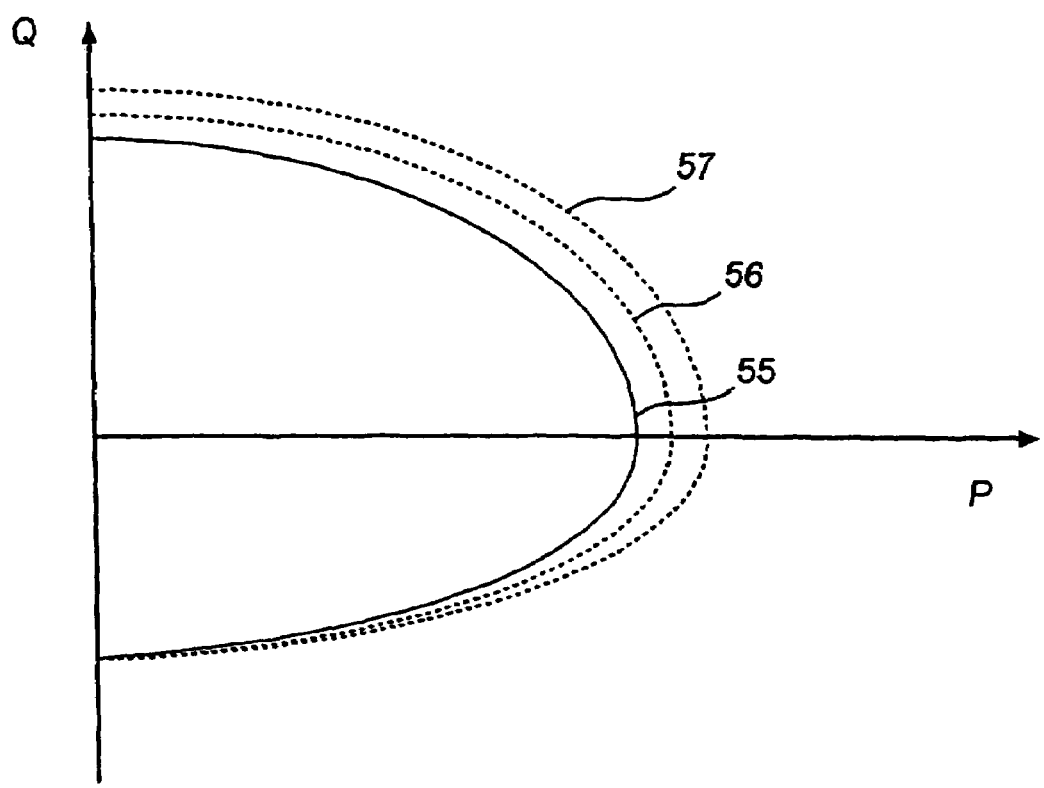
FIG. 8 is a chart illustrating the allowable reactive power output as a function of the active power output.

FIG. 8 is a graphic representation of the allowable reactive power output as a function of the allowable active power output. The unbroken line 55 indicates the possible power outputs when the machine rating limits are maintained, while the first dashed line 56 indicates the possible power outputs when the machine temperature as a function of a lower coolant temperature is allowed to control the power output. The second dashed line 57 indicates the possible power output during a limited time interval, for example 15 minutes, when the temperature is allowed to reach the design values of the insulation temperature class. By continuously calculating, in the control module 30, the estimated temperatures in the generator 9, optimal control of the generator can be achieved to ensure optimal operation of the generator 9.

According to this embodiment, the temperatures in the generator are calculated using a model of the machine, which model allows non-measurable temperatures in the generator to be calculated on the basis of generator output and coolant temperature and/or cooling capacity.

Naturally the maximum allowable temperature in the generator is dependent on the kind of insulation used in the generator.

Thus, by measuring the load and the coolant temperature, the temperature of different parts of the machine may be calculated using the model of the machine stored in the memory 45 of the control module 30. This means that, under most operating conditions, the machine can be subjected to a higher load than that specified by the machine rating, without exceeding the maximum allowable temperature for any part of the machine. Thus, the additional margin available due to the fact that a lower coolant temperature affords improved cooling may be used, for instance, to increase the machine load.

To increase the safety margin and the service life, the maximum allowable machine temperature is often set to a lower value than can be derived from the incorporated components. For example, in the case of a machine whose winding has a limit value of 155° C., the machine rating is often based on a maximum allowable winding temperature of 130° C. By allowing the temperature to reach 155° C. for short periods of time (for example 15 minutes), the machine can have a dynamic rating which allows a considerably higher load than that specified by the machine rating. Provided that this dynamic capacity is not exploited too often in the service life of the machine, the effect on the service life will be very marginal.

Naturally the invention is not limited to the embodiments described above, and may be modified in various ways within the scope of the appended claims.

For instance, a calculating device based on discrete components may be used rather than an ordinary computer provided with a computer program.

Naturally it is possible to operate the generator at the higher temperature for more than 15 minutes.

Alternatively, the higher temperature may be determined by the generator operator and not by insulation temperature limits. In this case, the generator owner may relate the reduced service life to increased earnings from temporarily operating the electric machine at a higher temperature.

It goes without saying that the invention is not limited to the embodiments described above, and may be modified in various ways within the scope of the appended claims. For instance, temperature estimation may be used solely for monitoring purposes to ensure the service life of the machine or for the purpose of maintenance scheduling. Monitoring and control may further be carried out by means of some form of communication from a remote location.

For example, a machine may, of course, be remote controlled and monitored by using the Internet to transmit information to and from the machine.

Although the above embodiments are based on a turbine connected to a generator, it is obvious to the person skilled in the art that the invention is also applicable to other synchronous machines such as synchronous compensators, motors or frequency converters.

The invention claimed is:

1. A control apparatus for controlling a rotating synchronous electric machine, characterized in that the electric machine is cooled by at least one coolant, wherein the temperature of the coolant is measured, and the electric machine comprises at least stator current, stator voltage, rotor current, and coolant temperature signal inputs, and that the control apparatus is arranged to transmit control signals for controlling at least one variable in the electric machine in dependence on the signals on the signal inputs and using a model of the electric machine, which model is used to estimate the temperature in at least two positions in the electric machine.

2. An apparatus for monitoring a rotating synchronous electric machine, characterized in that the electric machine is cooled by at least one coolant, wherein the temperature of the coolant is measured, and the electric machine comprises at least stator current, stator voltage, rotor current, and coolant temperature signal inputs and that the control apparatus is adapted to estimate the temperature in at least two positions in the electric machine in dependence on the signals on the signal inputs and using a model of the electric machine.

3. The apparatus according to claim 2, which further comprises a storage means, the estimated temperatures being stored in the storage means.

4. The apparatus according to claim 2, which further comprises a display means on which the estimated temperatures are displayed.

5. A power plant for generating electric power, comprising a turbine and a generator connected thereto, and a control apparatus as claimed in claim 1.

6. A synchronous compensator for synchronous compensation, which is controlled by means of a control apparatus as claimed in claim 1.

* * * * *